INVENTORS
RIKITA SAKATA
KOHEI MASUDA
MASANORI TAKASHI

United States Patent Office 3,671,383
Patented June 20, 1972

3,671,383
LAMINATED BIAXIALLY ORIENTED ISOTACTIC POLYPROPYLENE AND UNIAXIALLY ORIENTED ETHYLENE-PROPYLENE-FILMS
Rikita Sakata, Kohei Masuda, and Masanori Takashi, Yokkaichi-shi, Mie-ken, Japan, assignors to Mitsubishi Petrochemical Co., Ltd., Tokyo, Japan
Filed Nov. 4, 1968, Ser. No. 772,957
Claims priority, application Japan, Nov. 4, 1967, 42/70,868
Int. Cl. B32b 27/08
U.S. Cl. 161—252
2 Claims

ABSTRACT OF THE DISCLOSURE

A heat-sealable laminated polypropylene film composed of a biaxially oriented isotactic polypropylene film and at least one uniaxially oriented ethylene-propylene copolymer film containing at least 75% by weight propylene. A process for the production of such a laminated polypropylene film.

BACKGROUND OF THE INVENTION

Field of the invention

The present invention relates to heat-sealable laminated polypropylene film comprising a base of an isotactic polypropylene film having strongly adhered thereto at least one copolymer film mainly comprising propylene. The invention also relates to a process for producing the described laminated polypropylene film.

Description of the prior art

Biaxially oriented polypropylene films have excellent properties for use as a transparent packing material, but they have such faults as when the film is heated to the heat-sealing temperature, the film shrinks to its original unoriented state to form wrinkles, whereby the appearance of the laminated film and the strength of seal are reduced, and the commercial value of the film is also lowered.

In order to overcome such faults, attempts have been made to improve the heat-sealing property of an oriented polypropylene film, such as by coating the polypylene film with a heat-sealing material having a melting point lower than the polypropylene.

For example, there have been proposed: (1) a method in which the whole surface or at least the heat-sealing areas of an oriented polypropylene film are coated with a solution of a heat-sealing material such as a composition mainly comprising an ethylene-vinyl acetate copolymer; (2) a method in which a laminated film of an oriented polypropylene film is produced by laminating the polypropylene film and another heat-sealing film by means of press rolls, etc.; and (3) a method in which a low-temperature heat-sealing material is laminated on an oriented polypropylene film by a melt extrusion method. These conventional methods have proven to be unprofitable.

A biaxially oriented polypropylene film laminate having an easily heat-sealable surface layer is considered to be the best solution to the aforesaid heat-sealing problems of biaxially oriented polypropylene film, and to prepare such a laminated polypropylene film there has been considered a method wherein a laminated layer is formed on the surface of the biaxially oriented polypropylene film. However, this method has the following faults: when forming a laminated layer on a biaxially oriented polypropylene film by a melt extrusion method, it is difficult to reduce the thickness of the laminated surface layer to the necessary extent, and in the case of excessive thickening, the thickness of the surface layer (and also to practice such a method on an industrial scale), an extrusion laminating device having a very wide extrusion die must be used.

Instead of this method, there has been proposed a method in which a laminated surface layer is preliminarily formed on an unoriented polypropylene film, and thereafter the composite film is oriented biaxially.

However, this method has the following difficulties:

(1) When the laminated film is oriented or biaxially stretched, some types of resin which are used as the surface laminated layers experience an increase in heat-sealing temperature, which reduces the low temperature heat-sealing effect of the laminate. This is believed to be caused by crystallization of the resin used as the surface-laminated layer.

(2) The biaxial orientation of a polypropylene film is generally begun in the longitudinal orientation of the film, but when the laminated film is biaxially stretched, the orientation becomes uneven, and the thickness of the film in the longitudinal direction also becomes uneven.

(3) Since the material of the surface layer of the laminated film is more easily softened than polypropylene during longitudinal orientation step, the film slips between the stretch rolls, whereby scratches are formed, which ruins the appearance of the film.

(4) Since the surface laminated layer is subject to stretching twice, it is difficult to control the thickness of the surface layer.

SUMMARY OF THE INVENTION

A heat-sealable biaxially oriented polypropylene laminated film which illustrates improved qualities comprises an isotactic polypropylene film having coated on at least one surface an ethylene-propylene copolymer, said polypropylene film being in a biaxially oriented state and said ethylene copolymer containing at least 75% by weight propylene and being in a uniaxially oriented state.

A method for producing the above-described heat-sealable biaxially oriented polypropylene laminated film comprises laminating by melt extrusion an ethylene-propylene copolymer containing at least 75% by weight propylene to at least one surface of an isotactic polypropylene film which has been stretched to at least 1.3 times its original dimension in the longitudinal direction, and then after forming the composite propylene-ethylene-propylene copolymer film, stretching the composite film while heating to at least three times its original dimension in the transverse direction and then cooling the composite film while maintaining it substantially completely in the stretched state.

An object of this invention is to provide a biaxially oriented polypropylene film laminate having a good heat-sealing property as well as good transparency, high stiffness, and a high surface hardness, without being accompanied by the difficulties of the prior art.

Another object of the present invention is to provide a process for preparing such an improved polypropylene film laminate.

These objects can be attained by providing a laminated film comprising a biaxially oriented polypropylene film having at least one surface thereof coated with an uniaxially oriented film of a copolymer mainly comprising propylene.

DESCRIPTION OF THE PREFERRED EMBODIMENTS

Figure 1:
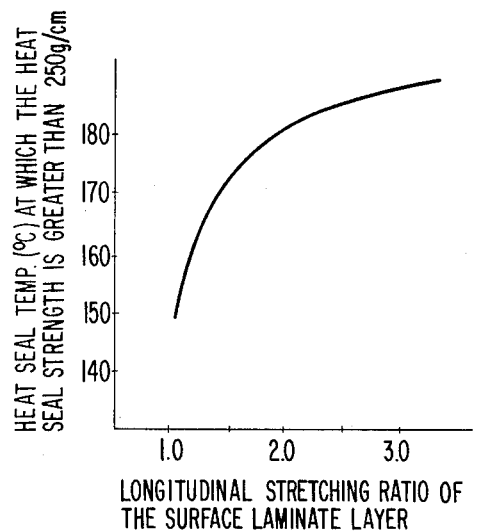
FIG. 1 illustrates the relationship between the heat-sealing temperature at which the heat sealing strength of a laminate becomes higher than 250 g./cm. and the longitudinal stretching ratio of the laminated surface layer.

The heat-sealable biaxially oriented polypropylene laminate film of this invention which is formed by the process of this invention is a laminated film of an isotactic polypropylene film having on at least one surface thereof an ethylene-propylene copolymer film (preferably ethylene-propylene copolymer), said isotactic polypropylene film being in a biaxially oriented state and said ethylene-propylene copolymer film containing at least 75% by weight propylene and being in an uniaxially oriented state.

The heat-sealable biaxially oriented polypropylene laminated film is prepared, according to the method of this invention, by laminating an ethylene-propylene copolymer containing at least 75% by weight propylene by melt extrusion to at least one surface of an uniaxially oriented isotactic polypropylene film stretched at least 1.3 times the original dimension of the film in the longitudinal direction, stretching the composite film thus obtained, under heat, at least three times the original dimension of the film in the transverse direction, and cooling the laminate while maintaining it substantially in the stretched state.

Thus, in the present invention, an uniaxially oriented film of a specific copolymer is employed as the surface laminate layer, and by the above-mentioned combination of specific films, the desired advantages or effects can be obtained.

In the present invention, a propylene copolymer having a specific composition is employed as the material used as the surface laminate layer. This copolymer has a good adhesive property without the need of adhesives to adhere it to the biaxially oriented polypropylene film, and thus improves the heat-sealing property of the laminated film without lowering the stiffness, transparency and surface hardness, which are features specific to biaxially oriented polypropylene film.

The copolymer is easily crystallized when streached biaxially. This fact may be confirmed by the following experiment, Case 1: A biaxially oriented polypropylene film laminate is prepared by laminating a copolymer consisting of 97.5% by weight propylene and 2.5% by weight ethylene (in an amount such that the thickness of the laminated layer after biaxially stretched is 7 microns) by a melt extrusion method (to the surface of an unoriented polypropylene film), stretching, under heating, the laminated film to 1.3–3.0 times its original dimension in the longitudinal direction, and then stretching it to 7 times its original dimension in the transverse direction. Case 2: The biaxially oriented polypropylene film laminate of this invention is prepared by laminating a copolymer having the same composition as above by a melt extrusion method to the surface of polypropylene film stretched in the longitudinal direction (in an amount such that the thickness of the laminated surface layer after transverse stretching is 7 microns) and then stretching the laminated film to 7 times its original dimension in the transverse direction. Both are heat sealed for one second at a pressure of 1 kg./sq. cm. by means of a hot plate type heat sealer, and then the strength of the heat seal thus formed in each is measured.

The relation of the heat seal temperature at which the heat seal strength becomes higher than 250 g./cm. and the longitudinal stretching ratio of the laminated surface layer is shown in FIG. 1 of the accompanying drawings. Upon comparing the case (Case 2) of this invention (where the laminated surface layer is subjected only to transverse stretching) with an uniaxially oriented (longitudinally stretched) polypropylene film) the longitudinal stretching ratio in FIG. 1 is 1.0) with the control case (Case 1) where the laminated surface layer is subjected to longitudinal stretching and transverse stretching with an unoriented polypropylene film, the merits of the present invention where the laminated surface layer is stretched only in one direction is clear, as illustrated by the results shown in FIG. 1.

The material used in this invention for the laminated surface layer providing such remarkable results is an ethylene-propylene copolymer containing at least 75% by weight propylene. If the content of propylene is less than 75% by weight, the low temperature heat-sealing property thereof may be greatly improved, but the adhesive property of the copolymer film with respect to the base of uniaxially oriented polypropylene film, the stiffness and transparency of the laminate (which are specific features of biaxially oriented polypropylene film) are lowered, as well as the surface hardness of the laminate surface being severely reduced when compared with the hardness of polypropylene. If this is the case, when the laminated film is used as a packaging material, the surface of the package tends to be scratched by rubbing between the package material and the articles in the package.

The most preferable copolymer used in the present invention is an ethylene-propylene copolymer comprising 99.5–95% by weight propylene and 0.5–5% by weight ethylene. The preferable ethylene-propylene copolymer used in this invention has a melt index of 0.5–20, preferably 4–8.

The polypropylene film used in this invention as the base film may be any polypropylene capable of being biaxially oriented. In general, a polypropylene film having an intrinsic viscosity of 1.5–3.3 measured at 135° C. in Tetralin and having an isotactic index of higher than 85% is preferably used.

The melt extrusion and stretching may be conducted by any conventional method utilized in the art.

The laminated surface layer of this invention illustrates the following advantages: the layer is strongly bonded to the base film of the uniaxially oriented polypropylene film by only a melt extrusion, without employing any adhesive. However, if desired, the laminate may be prepared by a melt extrusion after applying to the polypropylene base film an anchor coat such as is normally used in lamination by melt extrusion. The stretching or orientation is usually conducted under heating.

The biaxially oriented polypropylene film laminate of this invention which has an improved heat-sealing property can be used for packaging with a same industrial efficiency as in the case of using a heat-sealable cellulose film using an automatic back making machine or an overlap packaging machine by employing a heat-sealing temperature about 15–25° C. higher than conventionally employed temperature, and there will be no formation of thermal shrinkage of the biaxially oriented polypropylene film as has heretofore been the case.

Now, an example of the process of this invention will be explained more fully by referring to the embodiment shown in FIG. 2 of the accompanying drawing. In this example, the copolymer layer was formed on one surface of the polypropylene film.

Figure 2:
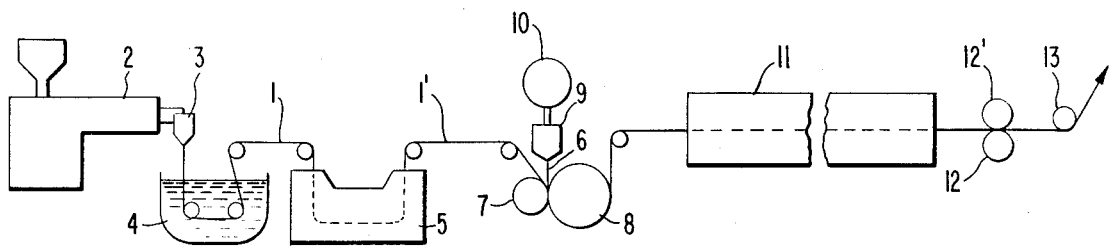
FIG. 2 is a schematic illustration of an embodiment of the process of the present invention.

In FIG. 2, a polypropylene film 1 was prepared by extruding through the slit of a die 3 polypropylene melted by heating to 260° C. and kneaded in an extruder 2. The extrudate was cooled in a water bath 4 to a temperature lower than 40° C. The unoriented polypropylene film was stretched to more than 1.3 times the dimensions thereof in the longitudinal direction by means of a stretching machine 5. The longitudinally oriented polypropylene film 1' was then laminated with an ethylene-propylene copolymer film 6 by passing the polypropylene film and the molten copolymer film between a metallic roll 8 (in which cooling water could pass, and the surface of which was finished to a mirror surface) and a rubber lined nip roll 7. The copolymer film for surface laminating had been prepared by extruding an ethylene-propylene copolymer (containing at least 75% by weight propylene) which had been melted and kneaded in an extruder 10 through a die slit 9. The composite (with the uniaxially oriented laminated polypropylene film) was stretched to at least three times its original dimension in a transverse direction by means of a tenter-type stretching machine 11, cooled while being maintained in the stretched state, withdrawn from the system by means of nip rolls 12 and 12', and after cutting off the edges of the laminate film at cutter 13, was rolled up.

Generally, the propylene utilized in the present invention has a molecular weight of from about 240,000 to about 580,000, preferably from about 320,000 to about 510,000; a density of 0.902 to about 0.913, and a melt index of from about 0.2 to about 12, preferably about 0.5 to about 4. The ethylene-propylene copolymer generally has a molecular weight of about 190,000 to about 510,000, preferably from about 270,000 to about 320,000, a density of from about .900 to about .909, and a melt index of from about 0.5 to about 20, preferably about 4 to about 8.

Further, the melt extrusion temperature may generally range from about 200 to about 290° C., preferably from about 230 to about 270° C. Melt extrusion is also acceptable for the calender lamination.

It will be appreciated by one skilled in the art that the above process parameters can be varied, so long as the essential requirements of the product are retained.

We claim:
1. A heat-sealable laminated film which comprises:
   (a) a biaxially oriented isotactic polypropylene film stretched at least 1.3 times its original dimension in a longitudinal direction, having coated on at least one surface thereof;
   (b) a uniaxially oriented ethylene-propylene copolymer film containing at least 75% by weight of polypropylene;
said heat-sealable laminated film stretched at least 3 times its original dimension in the transverse direction.

2. The heat-sealable biaxially oriented polypropylene film of claim 1 wherein said ethylene-propylene copolymer film contains from about 95 to about 99.5% by weight propylene and from about 0.5 to about 5% by weight ethylene.

References Cited
UNITED STATES PATENTS

| | | | |
|---|---|---|---|
| 3,187,982 | 6/1965 | Underwood et al. | 161—252 X |
| 3,294,621 | 12/1966 | Baird et al. | 161—252 X |
| 3,380,868 | 4/1968 | Moser | 161—252 X |
| 3,397,101 | 8/1968 | Rausing | 161—252 X |
| 3,481,804 | 12/1969 | Snyder | 161—252 |
| 3,496,061 | 2/1970 | Freshour et al. | 161—252 X |

JOHN T. GOOLKASIAN, Primary Examiner

C. B. COSBY, Assistant Examiner

U.S. Cl. X.R.

161—402; 260—27, 78.5 BB, 94.9 GD